US011551271B2

(12) United States Patent
Mohammad et al.

(10) Patent No.: US 11,551,271 B2
(45) Date of Patent: Jan. 10, 2023

(54) FEEDBACK SERVICE IN CLOUD APPLICATION

(71) Applicant: Microsoft Technology Licensing, LLC, Redmond, WA (US)

(72) Inventors: Haris Farhan Mohammad, Kirkland, WA (US); Marck Ramon Robinson, Kirkland, WA (US); Sreenivas Narayana Simhadri, Redmond, WA (US); Christopher Andrew Syers, Seattle, WA (US); Zoltan Pekic, Seattle, WA (US); Jeffrey Alexander Staiman, Bellevue, WA (US); Vishwa Shobhit Sahay, Redmond, WA (US); Roland Borges, San Francisco, CA (US); Keith Steven Brintzenhofe, Poulsbo, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 477 days.

(21) Appl. No.: 16/552,453

(22) Filed: Aug. 27, 2019

(65) Prior Publication Data
US 2021/0065258 A1    Mar. 4, 2021

(51) Int. Cl.
*G06Q 30/02* (2012.01)
*G06F 8/70* (2018.01)
*H04L 67/00* (2022.01)
*H04L 67/025* (2022.01)
*H04L 67/561* (2022.01)

(52) U.S. Cl.
CPC ........... *G06Q 30/0282* (2013.01); *G06F 8/70* (2013.01); *H04L 67/025* (2013.01); *H04L 67/34* (2013.01); *H04L 67/561* (2022.05)

(58) Field of Classification Search
None
See application file for complete search history.

(56) References Cited

U.S. PATENT DOCUMENTS

| 9,235,574 | B2 * | 1/2016 | Green | G06F 16/9535 |
| 2014/0279608 | A1 * | 9/2014 | Horst | G06Q 10/0639 |
| | | | | 705/317 |
| 2017/0001074 | A1 * | 1/2017 | Krueger | A61B 5/0537 |
| 2017/0214744 | A1 * | 7/2017 | Neves | H04L 67/34 |
| 2018/0309801 | A1 * | 10/2018 | Rathod | H04L 67/141 |
| 2019/0102473 | A1 * | 4/2019 | Chevalier | G06F 16/9577 |
| 2019/0179953 | A1 * | 6/2019 | Kline | G06F 16/335 |
| 2019/0303807 | A1 * | 10/2019 | Gueye | G06Q 10/02 |
| 2020/0349258 | A1 * | 11/2020 | Frost | G06F 21/57 |

OTHER PUBLICATIONS

Almaliki et al., "The design of adaptive acquisition of users feedback: An empirical study", May 1, 2014, IEEE, 2014 IEEE Eighth International Conference on Research Challenges in Information Science (RCIS) (pp. 1-12) (Year: 2014).*
Temkin, Bruce, "ROI of Customer Experience", In Temkin Group Insight Report, Aug. 2018, 20 Pages.
"Managing Customer Effort", In Oracle White Paper, Mar. 2015, 13 Pages.

* cited by examiner

*Primary Examiner* — Davoud A Zand
(74) *Attorney, Agent, or Firm* — Wade IP Law PLLC

(57) ABSTRACT

A feedback service for use with a cloud application and a method of the feedback service are disclosed. The feedback service is coupled to a page of the cloud application. A pane of the feedback service is selectively displayed with the page, and the pane requests user input regarding the page.

20 Claims, 4 Drawing Sheets

COUPLE FEEDBACK SERVICE TO PAGE
402

SELECTIVELY DISPLAY PANE TO REQUEST FEEDBACK
404

PROVIDE RESPONSES TO BACKEND SERVICE
406

DETERMINE WHETHER PAGE INCLUDES SURVEY
502

DETERMINE PREVIOUS RESPONSE INFORMATION
504

RECORD METADATA OF RESPONSE
506

FEEDBACK SERVICE IN CLOUD APPLICATION

BACKGROUND

Cloud computing is a model of service delivery for enabling convenient, on-demand network access to a shared pool of configurable computing resources that can be rapidly generated and released with nominal management effort or interaction with a provider of the service. Cloud computing allows a cloud consumer to obtain computing resources, such as networks, network bandwidth, servers, processing memory, storage, applications, virtual machines, and services as a service on an elastic and sometimes impermanent basis. Cloud computing platforms and infrastructures allow developers to build, deploy, and manage assets and resources for applications. Cloud computing may include security services that can protect resource and assets from attack.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Computer application providers, such as cloud service providers, attempt to improve computer programs and serve customer wants via customer input. Traditionally, customer input is provided via e-mail surveys that the computer application providers send to users, such as subscribers, of the computer programs to solicit feedback on the products. Such e-mail surveys often lack contextual-specific features, are prone to errors, and may not garner an adequate response. Further, such surveys may lead to survey fatigue in users.

The disclosure is directed to a feedback service for use with a cloud application and methods of the feedback service. The feedback service is coupled to a page of the cloud application. A pane of the feedback service is selectively displayed with the page, and the pane requests user input regarding the page. In one example, the feedback service includes an interface module that requests user input to a survey regarding the page. The survey can include a customer effort score and a customer value analysis survey. The feedback service can selectively provide the survey based on timing, usage, or behavior associated with a previous survey. The interface module provides the user to input to a backend service for processing.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

FIG. 4 is a block diagram illustrating an example method of the feedback service of FIG. 3.

FIG. 5 is a block diagram illustrating an example method of the method of FIG. 4.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
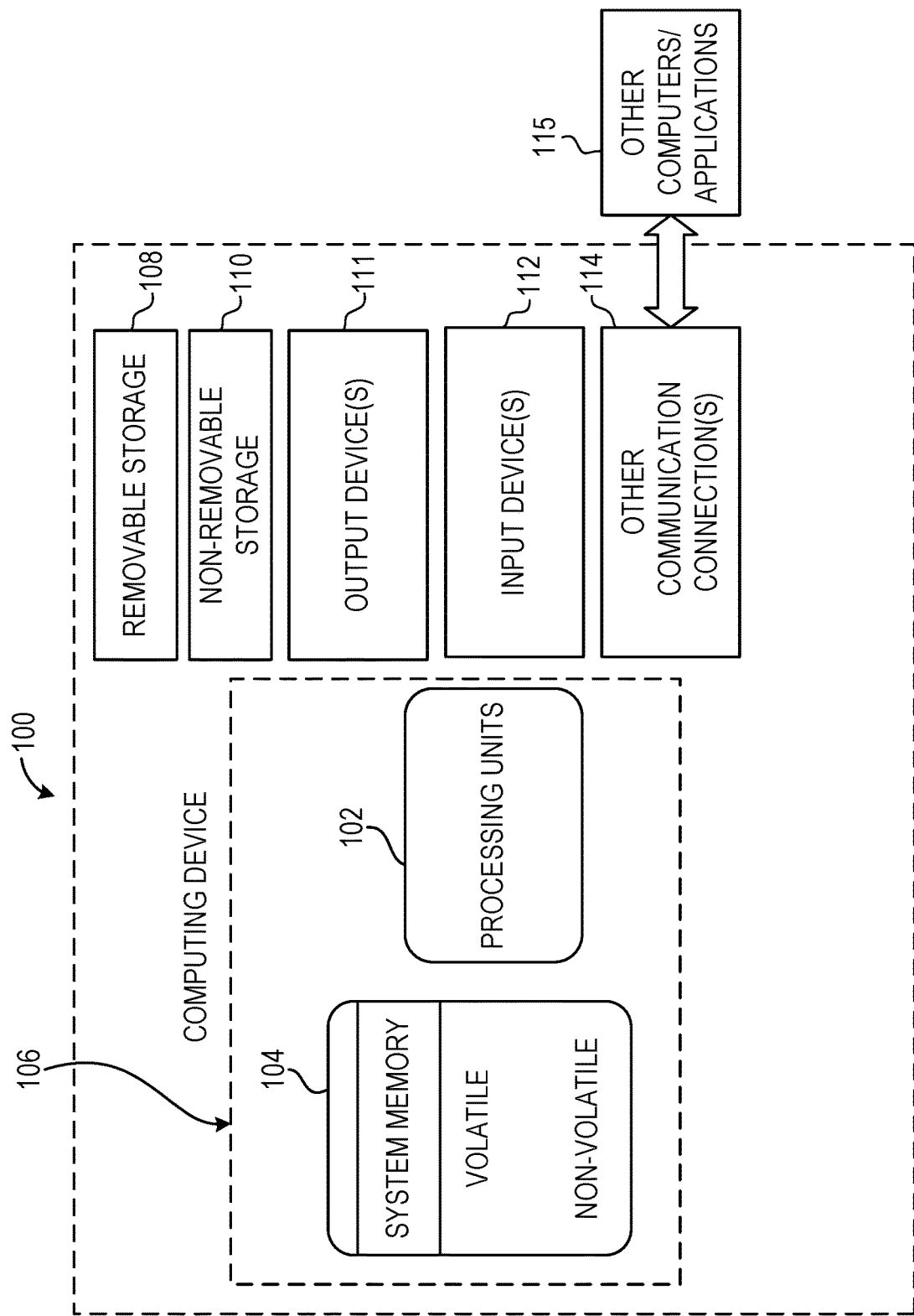
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums computer readable storage devices storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), nonvolatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the internet, or other network.

In one example, one or more of computing device 100 can be configured as a client device for a user in the network. The client device can be configured to establish a remote connection with a server on a network in a computing environment. The client device can be configured to run applications or software such as operating systems, web browsers, cloud access agents, terminal emulators, or utilities.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
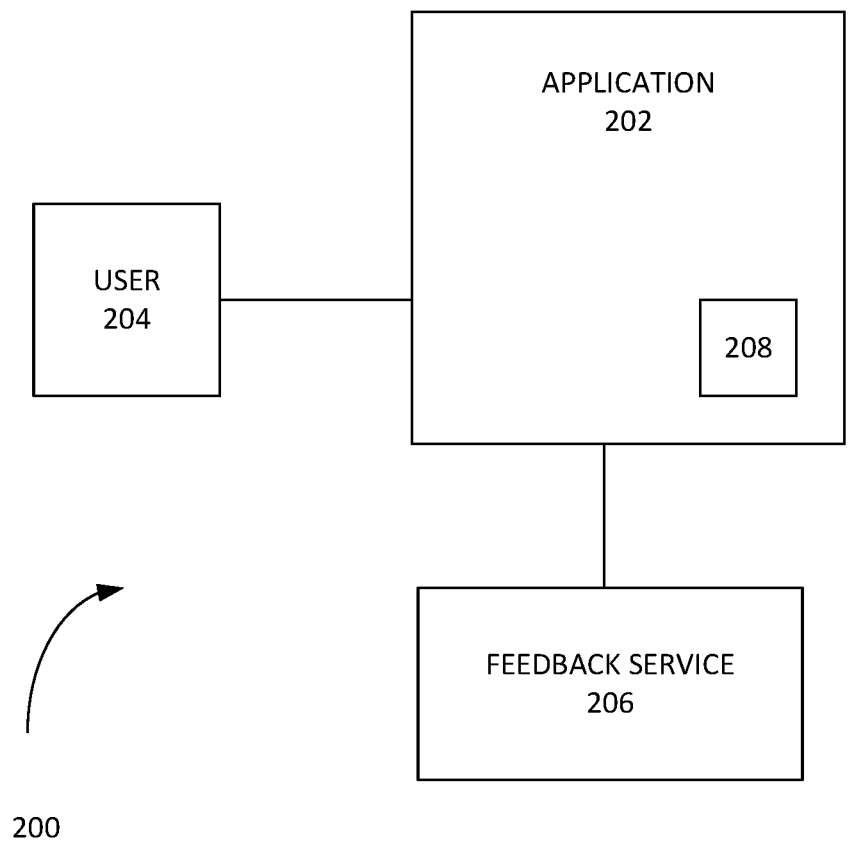
FIG. 2 is a schematic diagram illustrating an example a cloud-computing environment.

FIG. 2 illustrates an example a computing environment 200 such as computer network or cloud-computing environment to deploy a cloud application 202, which can include a web application, a cloud-based access and identity service, a cloud-based security service, a cloud hosting platform, or other software as a service, platform as a service, and infrastructure as a service application, that is accessed by a user 204, such as a user on a client device, and provided with a feedback service 206. In many cases, a web browser on the client device of user 204 is applied to access web applications, over the network 200, such as the internet. For example, the cloud application 202 can include an interactive user interface that is run inside the web browser to provide prompts to receive user inputs and display content or outputs of the cloud application 202. In one example, the user interface is implemented as a page 208, which includes the resources—e.g., HTML, JavaScript, CSS, XML, images, and other resource—to implement a particular high-level feature of the web application user interface. The cloud application 202 may include several pages that each implement a level of functionality as panes on a display, and a display may include one or more pages. Additionally, a page 208 may include links to additional pages. In one example, a user may access a page 208 in a session, navigate away from a page in the session to other pages, and return to the page in the session.

In one example, the cloud application 202 is a software model in which software is licensed on a subscription basis and is centrally hosted. The cloud application 202 is often accessed by a user 204 using a thin client, e.g. via a web browser application on a computing device, such as computing device 100. Cloud applications have become a common delivery model for many business, security, identity-access management, or other platform or infrastructure applications. Many cloud applications 202 are based on a multitenant architecture in which a single version of the application, with a single configuration such as hardware, network, and operating system, is used for all customers, or tenants. To support scalability, the cloud application is installed on multiple machines or horizontally scaled, in an environment such as a datacenter or multiple datacenters. This is contrasted with a more traditional application architecture, in which multiple physical copies of the software, which may include different versions, or different configurations, are installed across various customer sites such as on different computing devices of the enterprise. Some cloud applications do not use multitenancy, or may use other mechanisms such as virtualization to cost-effectively manage a large number of customers in place of multitenancy. In the example, the user 204 logs in or accesses the cloud application 202 and interacts with the cloud application 202 via the user interface during a logon session. In some examples, the cloud application 202 can monitor the behavior of the user 204 during the session while the user 204 has access to the cloud application 202.

The examples of the cloud application 202 are described with reference to a web application for illustration. The feedback service 206 is not limited to interfaces within a web browser. The feedback service 206 can be implemented to provide a page 208 such as a pane within user-facing portions of the cloud application as an application in, for example, a desktop operating system, a mobile application, or an application that is native to a computing platform that provides an interactive user interface and network, such as internet, connectivity.

Feedback service 206 is tethered to the page 208 of the cloud application 202 and can selectively prompt a user interface to provide a survey to the user 204 and receive responses during the session. The feedback service 206 can selectively provide the survey to the user 204 as an interactive user interface or pane on the page 208 during the session based on such criteria as the identity of the user, whether the user has interacted with the survey in the past, and time elapsed, if any, since a survey was last provided to the user. In one example, the feedback service 206 can be tethered to a plurality of pages 208 of the cloud application to request feedback on multiple features of the cloud application. Feedback service 206 provides a mechanism for application developers and customer support personnel to request and collect user input on selected specific features of the cloud application 202 during a session.

Traditionally, cloud application providers have used e-mail surveys to collect customer feedback on features of the cloud application. Cloud application providers may track their users and occasionally send surveys via e-mail or other online messaging mechanism to request customer input regarding the cloud application or its features in order to collect metrics such as customer satisfaction, customer effort in using the cloud application, or customer value of the cloud application. The users can complete the surveys and return them, often via e-mail, to the cloud application provider including agents the provider may use to administer the surveys. Often, the number of user responses to the e-mail surveys is a relatively small percentage of the number of users or the number of surveys sent out by the provider, and such a small sample of users may not represent a significant base of users to draw reliable conclusions and may provide mere anecdotal insight to use of the cloud application. Further, the survey may request feedback on a number of features of the cloud application at a time removed from the use of the cloud application, and the user responses may be based on inaccurate recollection of the cloud application.

Feedback service 206 provides for contextual-particular surveys that can be tailored to request feedback on features of the cloud application 202 as the user 204 is experiencing the features. In one example, a page 208 provides a feedback service 206 to obtain responses for a customer effort score (CES) and a customer value analysis (CVA) as a user 204 is experiencing a feature of the cloud application 202. Customer Effort Score (CES) measures user satisfaction with the cloud application with questions that gauge the ease of the experience. According to some studies, the cloud application provider can create a more loyal customer by reducing customer effort. Customer Value Analysis (CVA) refers to a research method that is used to identify how the cloud application is perceived by users. The CVA allows the cloud application provider to gauge how the cloud application is judged in comparison to industry alternatives. In-sessions surveys can generate a larger percentage of responses than e-mail surveys and can be designed to illicit responses on features currently being used.

Surveys from the feedback service 206 can be designed to address particular concerns of the cloud application and be provided to request responses to users utilizing the features related to the particular concerns. For example, a cloud application may rollout a new user interface for a particular page. Not all users of the application may access the page during the session, but those that do may be provided with a survey to gauge user experience with the new user interface. The feedback service 206 can request and collect immediately relevant, use-case/feature specific actionable responses. Based on responses, cloud application providers can prioritize development of features of the cloud applications and prioritize which users to engage with on future projects. Based on the responses, the cloud application provider can identify detractors or prevent users from becoming detractors. Also, customer service personnel or customer engagement teams can use data from the responses to better serve users.

Figure 3:
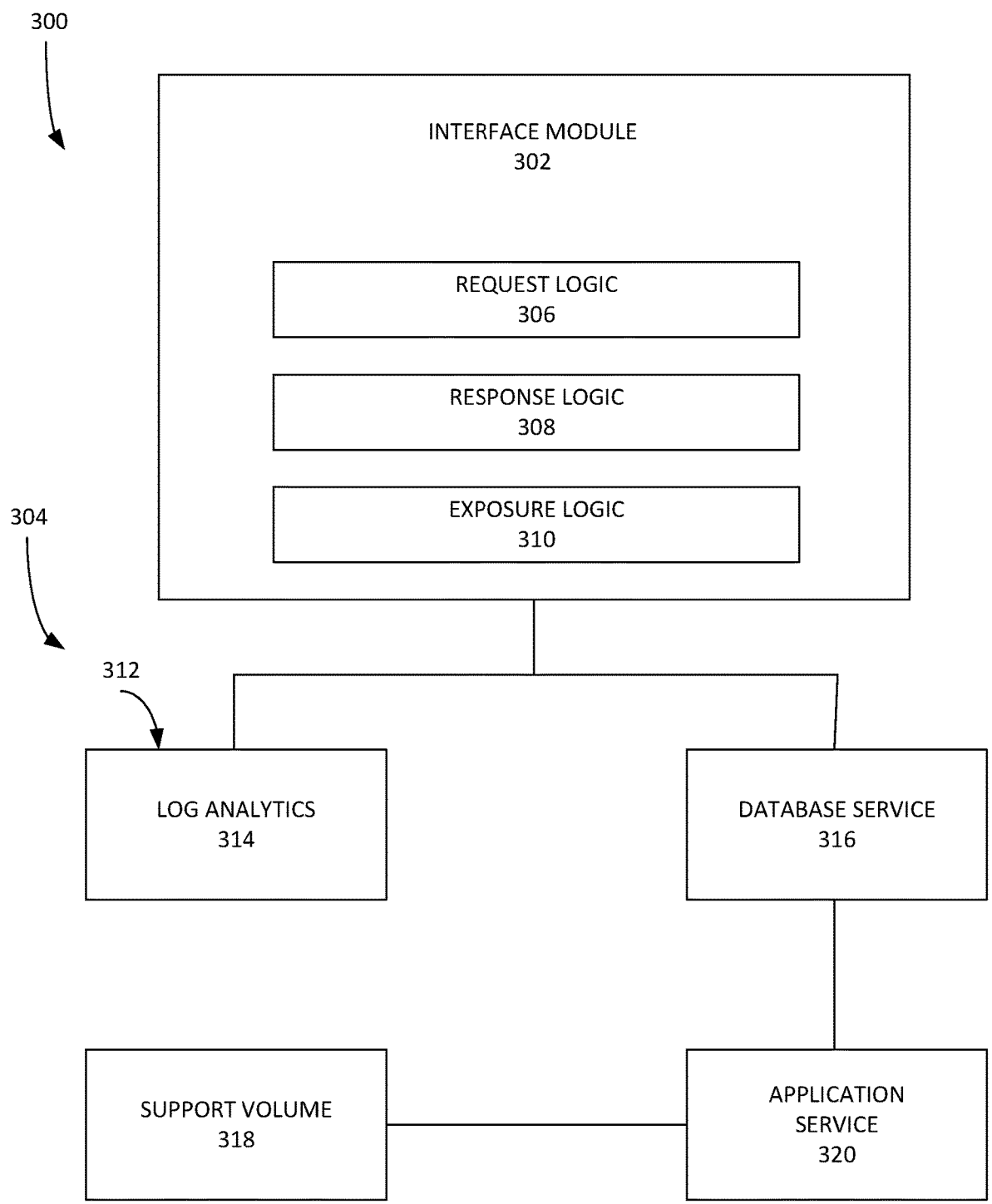
FIG. 3 is a schematic diagram illustrating an example feedback service, which can be included in the cloud computing environment of FIG. 2.

FIG. 3 illustrates a feedback service 300, which in one example, can be incorporated into feedback service 206. The feedback service 300 includes an interface module 302 and a backend service 304. The interface module 302 includes request logic 306 to provide a survey interface in a page, such as page 208, to request an input from a user, such as user 204. The interface module 302 also includes response logic 308 to provide inputs received from the user to the backend service 304 for further processing. Additionally, the interface module 302 includes exposure logic 310 to selectively provide the survey interface to the user based on timing, usage, or behavior of the user. In one example, the exposure logic 310 can control whether the request logic 306 provides the survey interface in a pane of a cloud application, such as cloud application 202. In one example, the feedback service 300 can be implemented as a computer program to run on a computing device, such as computing device 100. In one example, the interface module 302 or portions of the interface module 302 can be implemented in a web browser on a client device. In other examples, the interface module 302 or portions of the interface module 302 can be implemented in the cloud application 202 on the client device.

The request logic 306 can generate a survey interface as an overlay or separate pane onto the cloud application that provides CES/CVA questions for the user to answer. For example, the CES/CVA questions can be directed to the amount of effort or ease of use of the cloud application or the particular features of the page of the cloud application corresponding with the survey interface and the amount of value the cloud application or the particular features of the page of the cloud application corresponding with the survey interface provides the user. The survey interface can include a scale with values that can allow the user to select a value to provide a response. Additionally, the survey interface can include a box to accept a text response to allow the user to make comments. The user inputs or responses to the request logic 306 can be received by the response logic 308. The response logic 308 can format and prepare the user inputs to the request logic 306 for communication to the backend service 304. In one example, the response logic 308 can transmit the user inputs as data over a computer network to the backend service 304. Additionally, the response logic 308 can provide metadata along with the user inputs, such as form of CES/CVA questions, location of the survey interface overlay with respect to the display, date, time, and other information that can be tracked to determine the quality of the survey and the responsiveness of users to the survey.

In one example, the backend service 304 includes a database that is coupled to the interface module 302 via a computer network to receive the user inputs from the response logic 308 and to categorize the user inputs by user. FIG. 3 illustrates a particular backend service 304 that can apply cloud technologies and machine learning for analysis. Backend service 304 includes a backend platform 312 that is configured to receive the user inputs and to classify the user inputs by keywords and bucket the user inputs as data into issues and feature requests. Backend platform 312 can include tools to understand, track, and take action on the data. Depending on the amount of responses expected, in one example, the data can be provided to a log analytics service 314 that is configured for big data queries, or storing and running interactive analytics with big data, such as available under the trade designation Azure Kusto from Microsoft Corp. of Redmond, Wash., U.S.A. The log analytics service can supplant relational database management systems for online transaction processing and data warehousing. The data may also be provided to a multi-model database service 316, such as available under the trade designation Azure Cosmos from Microsoft Corp. Backend service 304 can also include a support volume data storage 318 as storage. The data from the support volume data storage 318 and data from the database service 316 can be provided to an application or components for building and hosting an application 320, such as a web application built via a project available under the trade designation Katana from Microsoft Corp.

FIG. 4 illustrates an example method 400 that can be used with the example computer environment 200 and feedback service 300 to obtain product feedback from a user of a page of a cloud application, such as page 208 of cloud application 202. In one example, the feedback service, such as feedback service 206, 300 is coupled to a page 208 of a cloud application 202, at 402. The feedback service selectively displays a pane with the page in which the pane requests feedback regarding the page via user input at 404. The feedback service can provide responses to a backend service, such as backend service 304, at 406. The pane can include a CES/CVA survey requesting a response from the user. The user can input a response to the survey by selecting buttons or creating text in the pane. In one example, the feedback service is a stand alone service that is associated with the cloud application, such as to run in a web browser with the cloud application, at 402. In another example, the feedback service is incorporated into the cloud application at 402. The feedback service can be associated with the page, or selected pages in particular, rather than the cloud application in general. Thus, the pane is selectively displayed when the page is accessed. In some examples, the pane may disappear if the user navigates away from the page associated with the feedback service, and the pane may reappear if the user returns to the page. In some examples, the user has the ability to close the pane prior to completing the survey. In one example, providing the responses or user inputs to a backend service at 406 includes providing the user input to a database. After the user completes the survey, the feedback service may provide an indication on the page that feedback was completed on the page, such as a notification on the user interface of the cloud application the feedback was provided. In some examples, the feedback service can provide an indication on the page as to plans or mechanisms to access documents that are related to features on which the user provided feedback.

FIG. 5 illustrates an example method 500 that can be used to selectively display the pane at 402 to avoid oversampling or survey annoyance. A determination is made as to whether the page includes a survey and the user has accessed the page at 502. If, for example, the page includes a survey and the user has accessed the page, a determination is made as to whether and when the user has last seen the survey and how the user responded at 504. For example, the pane may be selectively displayed at 402 if a user accessing a page with a survey has not been polled in a predetermined amount of time, such as 90 days. In another example, the pane may be selectively displayed at 402 if a user accessing a page with a survey has not been polled in a predetermined amount of time regarding the cloud application or regarding the page. The preselected amount of time may be modified, such as shortened or lengthened, if the user closed out the survey rather than respond to the survey the previous time the survey was displayed to the user, if the user responded in a certain manner, such as negatively or positively, or the page of the cloud application has been changed since the previous time the survey was displayed to the user. In another example, the pane may be selectively displayed in a preselected number of user sessions or a percentage of sessions, such as once every 100 sessions or randomly in 1% of the sessions in addition to or instead of a predetermined amount of time. The reaction and the time and date of the reaction to the survey are recorded at 506. Metadata regarding the user response to the survey, such as whether the user was provided with the survey and whether the user responded, can be stored with the user profile to be accessed with method 500.

The example systems 200, 300 and methods 400, 500 can be implemented to include a combination of one or more hardware devices and computer programs for controlling a system, such as a computing system having a processor and memory, to perform method 400 For instance, systems 200, 300 and methods 400, 500 can be implemented as a computer readable medium or computer readable storage device having set of executable instructions for controlling the processor to perform the methods 400, 500. The systems 200, 300 and methods 400, 500 can be included as a service in a cloud environment. In one example, the systems 200, 300, and methods 400, 500 can be implemented as a cloud service over a computer network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for use with a cloud application, the method comprising:
    coupling a feedback service to a page of the cloud application, the feedback service to measure user experience regarding the cloud application from a plurality of users of the cloud application; and
    selectively displaying with the page a pane of the feedback service requesting user input regarding at least one of an amount of value provided by multiple features of the cloud application or an amount of effort to use the cloud application, the selectively displaying the pane of the feedback service to a user of the plurality of users based on a selected elapsed amount of time of polling the user of the plurality of users, the selected elapsed amount of time based on a previous user input.

2. The method of claim 1, wherein the cloud application is a web application.

3. The method of claim 1, wherein the feedback service is incorporated into the cloud application.

4. The method of claim 1, comprising:
    providing the user input to a backend service that includes a database.

5. The method of claim 1, wherein selectively displaying the pane includes determining whether the pane has been previously displayed in a preselected amount of time.

6. The method of claim 5, wherein determining whether the pane has been previously displayed includes determining a type of the user input.

7. The method of claim 1, wherein the pane of the feedback service provides a survey; and
    wherein the method further comprises:
        modifying the selected elapsed amount of time based on the previous user input closing the survey rather than responding to the survey.

8. The method of claim 1, wherein selectively displaying the pane comprises:
    selectively displaying with the page the pane of the feedback service requesting the user input regarding the amount of value provided by the multiple features of the cloud application in comparison to alternatives.

9. A computer readable storage device to store computer executable instructions to control a processor to:
    couple a feedback service to a page of a cloud application, the feedback service to measure user experience of the cloud application from a plurality of users of the cloud application; and
    selectively display with the page a pane of the feedback service to request user input regarding at least one of an amount of value provided by particular features of the page or an amount of effort to use the particular features of the page, the selectively displaying the pane of the feedback service to a user of the plurality of users based on a selected elapsed amount of time of polling the user of the plurality of users, the selected elapsed amount of time based on a previous user input.

10. The computer readable storage device of claim 9, wherein the instructions to selectively display the pane include logic to selectively provide a survey interface based on timing, usage, or behavior associated with a previous survey.

11. The computer readable storage device of claim 10, wherein the instructions to selectively display the pane include logic to selectively provide a survey interface based on whether a previous survey was displayed within a preselected amount of time.

12. The computer readable storage device of claim 10 including instructions to store metadata regarding timing, usage, or behavior associated with the previous survey.

13. A system, comprising:
    a memory device to store a set of instructions; and
    a processor to execute the set of instructions to:
        couple a feedback service to a page of a cloud application, the feedback service to measure user experience of the cloud application from a plurality of users of the cloud application; and
        selectively display with the page a pane of the feedback service to request user input regarding at least one of an amount of value provided by multiple features of the cloud application or an amount of effort to use the cloud application, the selectively displaying the pane of the feedback service to a user of the plurality of users based on a selected elapsed amount of time of polling the user of the plurality of users, the selected elapsed amount of time based on a previous user input.

14. The system of claim 13, wherein the instructions are implemented with a cloud service.

15. The system of claim 14, wherein the cloud service includes an interface module and a backend service; and wherein the backend service includes a log analytics service and a database service to receive the user input.

16. The system of claim 15, wherein the database service is coupled to a data storage and components for building a web application.

17. The system of claim 13, wherein the instructions to selectively display the pane include logic to selectively provide a survey interface based on timing, usage, or behavior associated with a previous survey.

18. The system of claim 13, wherein the pane of the feedback service requests the user input regarding the amount of value provided by the multiple features of the cloud application.

19. The system of claim 13, wherein the pane of the feedback service requests the user input regarding the amount of effort to use the cloud application.

20. The system of claim 13, wherein the processor is to execute the set of instructions to:
  modify the selected elapsed amount of time based on the previous user input.

* * * * *